(12) United States Patent
Laffaye et al.

(10) Patent No.: US 10,278,129 B2
(45) Date of Patent: Apr. 30, 2019

(54) MOBILE DEVICE POWER CONTROL

(71) Applicant: HEWLETT-PACKARD DEVELOPMENT COMPANY, L.P., Houston, TX (US)

(72) Inventors: Eduardo Alberto Cuervo Laffaye, Palo Alto, CA (US); Souvik Sen, Palo Alto, CA (US); Kyu Han Kim, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 14/906,655

(22) PCT Filed: Sep. 11, 2013

(86) PCT No.: PCT/US2013/059118
§ 371 (c)(1),
(2) Date: Jan. 21, 2016

(87) PCT Pub. No.: WO2015/038106
PCT Pub. Date: Mar. 19, 2015

(65) Prior Publication Data
US 2016/0183193 A1 Jun. 23, 2016

(51) Int. Cl.
H04W 52/02 (2009.01)

(52) U.S. Cl.
CPC ... *H04W 52/0254* (2013.01); *H04W 52/0251* (2013.01); *H04W 52/0261* (2013.01); *H04W 52/0264* (2013.01); *Y02D 70/1224* (2018.01); *Y02D 70/142* (2018.01); *Y02D 70/144* (2018.01); *Y02D 70/166* (2018.01); *Y02D 70/23* (2018.01)

(58) Field of Classification Search
CPC .................... H04W 52/0254; H04W 42/0251
USPC ........................................................ 370/311
See application file for complete search history.

(56) References Cited

U.S. PATENT DOCUMENTS

| 7,860,469 B2 | 12/2010 | Mohanty et al. |
| 8,275,423 B2 | 9/2012 | Matson et al. |
| 9,198,193 B1 * | 11/2015 | Williams ............ G06F 9/5027 |

(Continued)

FOREIGN PATENT DOCUMENTS

| CN | 102640541 | 8/2012 |
| CN | 102667668 | 9/2012 |

(Continued)

OTHER PUBLICATIONS

Zhang, L. et al., ADEL: an Automatic Detector of Energy Leaks for Smartphone Applications, (Research Paper), Oct. 7-12, 2012, 10 Pages, http://web.eecs.umich.edu/~zmao/Papers/codes12.pdf.

*Primary Examiner* — Peter G Solinsky
(74) *Attorney, Agent, or Firm* — HPI Patent Department

(57) ABSTRACT

A method for power management of a mobile device. The method includes evaluating content of a plurality of applications received at a mobile device operated by a user and determining latency information for each of the plurality of applications. The method further includes dynamically determining a priority of the plurality of applications based on the latency information for each application, and dynamically adjusting the mobile device between at least two wireless power modes based on the priority of the plurality of applications.

12 Claims, 6 Drawing Sheets

(56) References Cited

U.S. PATENT DOCUMENTS

| | | | |
|---|---|---|---|
| 2008/0091851 A1* | 4/2008 | Sierra | G06F 3/16 710/22 |
| 2010/0299540 A1* | 11/2010 | Brenneman | G06F 1/3225 713/300 |
| 2011/0068624 A1* | 3/2011 | Dibachi | H02J 7/35 307/18 |
| 2011/0145920 A1* | 6/2011 | Mahaffey | G06F 21/564 726/22 |
| 2011/0173474 A1* | 7/2011 | Salsbery | G06F 1/206 713/323 |
| 2012/0047379 A1 | 2/2012 | Chen et al. | |
| 2012/0210150 A1 | 8/2012 | De Lind Van Wijngaarden | |
| 2012/0210325 A1 | 8/2012 | De Lind Van Wijngaarden | |
| 2012/0236834 A1 | 9/2012 | Ho et al. | |
| 2013/0139262 A1* | 5/2013 | Glew | G06F 21/56 726/23 |
| 2013/0143504 A1 | 6/2013 | Devara et al. | |
| 2013/0226669 A1* | 8/2013 | Chiang | G06Q 30/0206 705/7.35 |
| 2013/0311811 A1* | 11/2013 | Bose | G06F 9/50 713/340 |
| 2018/0039316 A1* | 2/2018 | Brown | G06F 1/3206 |

FOREIGN PATENT DOCUMENTS

| | | |
|---|---|---|
| CN | 102811336 | 12/2012 |
| CN | 103080870 | 5/2013 |

\* cited by examiner

MOBILE DEVICE POWER CONTROL

BACKGROUND

Wireless communication technologies have seen dramatic improvements over the past years. Increasing number of today's mobile users carry mobile devices that are equipped with a diverse set of communication or radio interfaces. Through these interfaces, the mobile devices cart establish communications with each other, reach the internet, or access various data services through wireless networks. Various devices such as Internet-enabled tablets, smart phones, laptops, televisions, and gaming consoles have become essential personal accessories, connecting users to friends, work, and entertainment. Users now have more choices and expect to have the best possible access to all devices, data, and content at all times. The increased number of users that utilize wireless communication services stimulates providers to offer devices that deliver longer battery life and improved communication options that can meet the increase in user demand, support the array of new services, and provide reliable communication.

DETAILED DESCRIPTION

Figure 1:
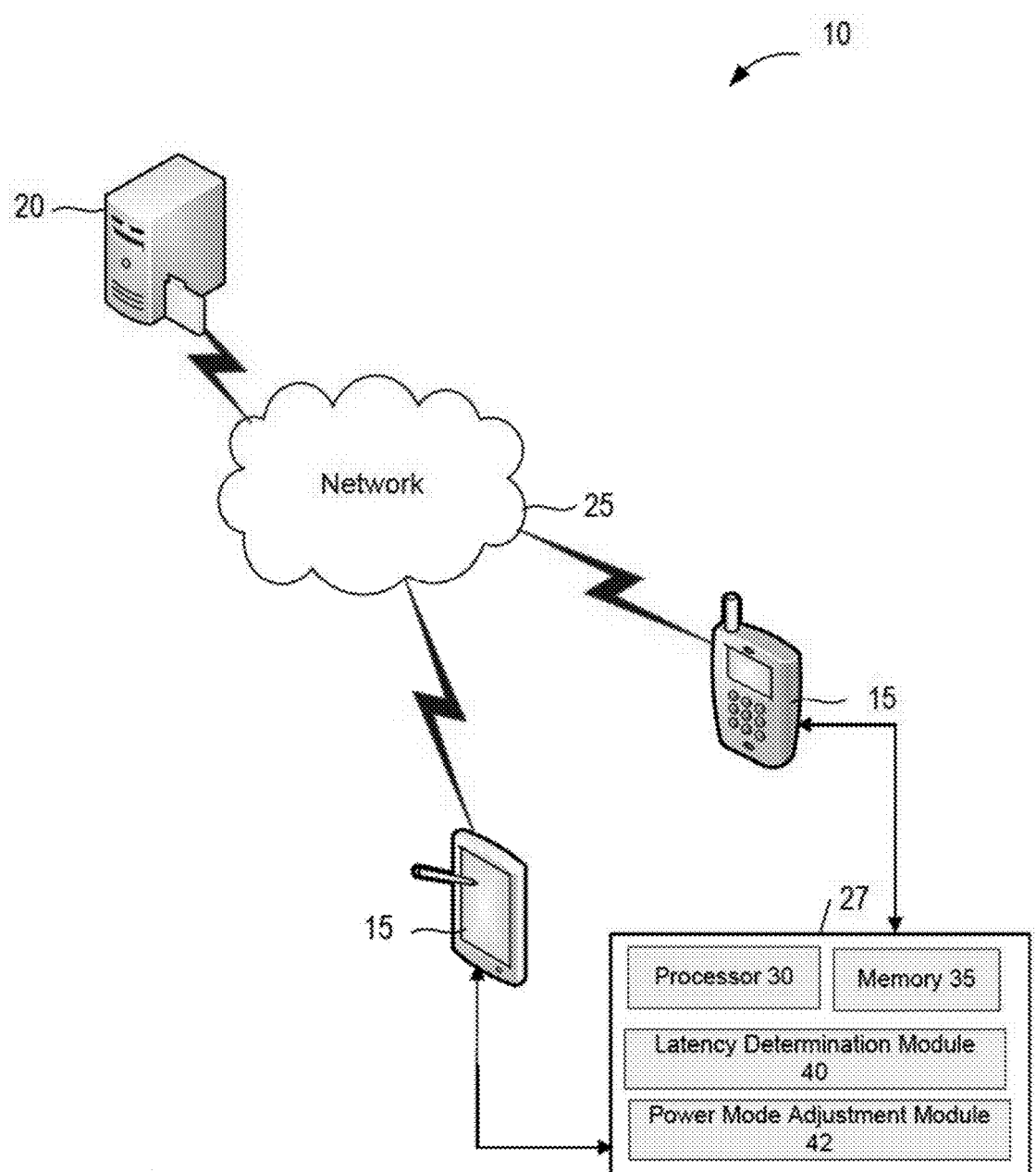
FIG. 1 is a schematic illustration of an example of a system for power management of a mobile device.

With the recent improvements in technology, mobile communication devices (e.g., smartphones, tablets, etc.) continue to play an increasing role in people's life. Different users rely on such mobile devices for many day-to-day activities and work related tasks. Thus, it is very common that the mobile devices run one or more complex applications simultaneously throughout the day. These applications usually require the implementation of complex processing resources, displays, and communication systems in the mobile devices. All these features in the mobile devices demand the constant use of power. Consequently, power or energy management of the mobile devices is a common and ongoing issue in the industry.

Effective wireless power management is an important component of the overall energy consumption of a mobile device and can strongly impact the energy consumption of such device. Generally, when a mobile device runs various applications, the Wi-Fi® radio (or another type of wireless radio) of the mobile device is on Constant Awake Mode (CAM). To save energy whenever possible, the Wi-Fi® radio of the mobile device can operate in a power saving mode (PSM). The CAM mode may consume 10-20 times the amount of energy than is consumed by the PSM mode.

While it is possible to always use the PSM mode in a mobile device, constant use of the PSM mode affects the performance of interactive applications in the mobile device by introducing added latency of up to 300 milliseconds (ms). This added latency can disrupt the experience of the user of the mobile device, especially during web browsing, real-time voice over IP (VoIP) calls, or multiplayer games. On the other hand, the CAM mode delivers low latency, but at the expense of high power consumption.

This description is directed to systems, methods, and computer readable media for controlling the energy consumption in a mobile device. One solution to the above-identified scenario is to dynamically determine (i.e., in real-time) whether PSM or CAM should be used and switch the Wi-Fi® power mode of the mobile device accordingly while the device is running one or more applications. In this description, real-time is defined as the time in which the one or more applications are currently running on the mobile device. That way, the mobile device can provide both a satisfactory user experience and obtain high energy savings. For example, it is important to allow real-time applications to use the CAM mode, while other background applications can use the PSM mode to save energy. The power mode of the device may be switched based on the latency requirement for each of the running applications.

However, it may be difficult to determine the latency requirement of different applications in the mobile device at runtime, particularly from a user's perspective. Described herein are techniques for dynamically adjusting the mobile device between at least two Wi-Fi® power modes based on a latency requirement of the applications of the different applications running on the mobile device without relying exclusively on traffic volume information. This description, describes a mechanism that determines the latency information or requirement of different applications on the mobile device (e.g., by using a taint-tracking technique), and labels the running applications will priority based on the latency information.

In the proposed description, latency information of an application is determined based on the actual consumption time of the content of each application by the user. In particular, the actual consumption time of the application content includes the time from when the content arrives at the mobile device until the time the content or information derived from the content reaches the user. From a user experience perspective, what matters is that the content is delivered to the user timely and without interruptions. As content arrives at the mobile device, users consume some of it very quickly, while they may allow less latency-sensitive content to languish in memory or storage. The proposed mechanism allows high priority applications in the mobile device to use the high-energy CAM mode, while low priority applications use the PSM mode to maintain energy efficiency.

In some implementations, the description proposes a method for power management of a mobile device. The method includes evaluating content of a plurality of applications received at a mobile device operated by a user and determining latency information for each of the plurality of applications. The method further proposes dynamically determining a priority of the plurality of applications based on the latency information for each application, and dynamically adjusting the mobile device between at least two wireless power modes based on the priority of the plurality of applications.

In other example implementations, the description proposes a system that includes a mobile device in communication with at least one external system, and a computing device connected to the mobile device. The computing device includes a control unit to execute instructions stored in a non-transitory machine-readable storage medium. The control unit is to receive, at the mobile device, data related to at least one application from the at least one external system. Further, the control unit is to determine latency information for the at least one application, where the latency information is determined based on a consumption rate of the data of the application by a user of the mobile device. Also, the control unit is to determine a threshold value based on the latency information and to dynamically control a wireless power mode of the mobile device based on the threshold value.

As used herein, the terms "mobile device" and "wireless device" may be used interchangeably and refer to any one of various smartphones, cellular telephones, tablets, laptop computers, personal data assistants (PDA's), VoIP phones, wireless enabled televisions, wireless enabled entertainment systems, and other similar electronic devices that include a processor and are capable of sending and receiving wireless or wired communication signals.

As used herein, the term "communication interface" refers to various protocols available to any of the wireless devices to communicate with each other and with a network. In particular, the communications interface may include Wi-Fi®, Bluetooth®, 3G, 4G, and any other comparable communications interfaces.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

FIG. 1 is a schematic illustration of an example of a wireless communication system 10 for power management of a mobile device. The system 10 includes at least one mobile device 15 (where a single user may own and operate more than one mobile device) in communication with at least one external system 20 (e.g., a web server, a base station, etc.), a computing device 27 in communication with the mobile device 15, and a network 25 connecting the mobile device 15 with the external system 20 and other systems or devices. In the illustrated example, the illustrated mobile devices 15 include a tablet and a smart-phone operated by a user (not shown). In alternative examples, the user can own or operate different wireless devices (e.g., cellular telephones, laptops, PDAs, wireless televisions, wireless entertainment systems, and other similar wireless devices).

The mobile devices 15 include software, hardware (e.g., processor, memory, etc. not shown), or a suitable combination thereof operable to enable functionality of the mobile devices 15 and to allow them to interact with the one or more external systems or any other devices. For example, the mobile devices 15 include communication interfaces that are used to connect with the other wireless devices and/or to a network. The communication interfaces of the mobile devices 15 may include a Wi-Fi® interface, a Bluetooth interface, a 3G interface, a 4G interface, a near filed communication (NFC) interface, and/or any other suitable interface. Further, regardless of the type of communication interface, each wireless device 15 includes a built-in wireless radio (e.g., a Wi-Fi® radio, not shown) or is coupled to such radio. It is to be understood that the proposed description is not restricted to controlling the Wi-Fi® power modes of a mobile device but may also apply to controlling the wireless mode in any other type of wireless systems in a similar way.

Each one of the mobile devices 15 is connected to a computing device 27 (for clarity only one computing device 27 is shown in FIG. 1). The computing device 27 can be internal to the mobile devices 15 or can be also external to the mobile devices 15. In the illustrated example, the computing device 27 includes a processor 30, a memory 35, a latency determination module 40, and a power mode adjustment module 42 for determining a latency information for each of the plurality of applications running on the mobile device 15 and for dynamically adjusting the mobile device between at least two Wi-Fi® power modes based on the priority of the plurality of applications.

The at least one external system 20 may include a web server, a base station, or any other system or device operable to communicate with the mobile device 15 via a wireless communication and to transfer information to the mobile device 15. The external system 15 includes software, hardware (e.g., processor memory, etc. not shown), or a suitable combination thereof operable to enable functionality of the device 20 and to allow the device 20 to interact with the mobile device 15 or to support communication between the mobile devices 15 and any other external systems. For example, the external system 20 includes communication interfaces that are used to connect with the other devices and/or to a network.

Each of the mobile devices 15 is connected to the external system 20 via the network 25 so the mobile device 15 can communicate with the external system 20 and the external system 20 can transmit information via mobile applications that run on the mobile device 15. In addition, the mobile devices 15 can communicate with any other systems or devices via the network 25. The network 25 may include any suitable type or configuration of network to allow the mobile devices 15 to communicate with the at least one external system 20 and/or any other systems or devices.

For example, the network 25 may include a wide area network ("WAN") (e.g., a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.). The network 25 can further include a local area network ("LAN"), a neighborhood area network ("NAN"), a home area network ("HAN"), a personal area network ("PAN"), a public switched telephone network ("PSTN"), an intranet, the Internet, or any other suitable network.

The computing device 27 provides functionality to operate the mobile device 15 and to receive and process information or data received from the external system 20, the network 25, and/or any other devices external to the mobile device 15. It is to be understood that the operations described as being performed by the computing device 27 that are related to this description may, in some implementations, be performed by any other computing device or a processor associated with the mobile devices 15.

As described in additional detail below, in one example, the computing device 27 receives data related to at least one application running on the device 15 and determines latency information for the at least one application. The latency information is determined based on the consumption rate of the data of the application by the user of the mobile device, by tracking the time the data is received at the mobile device until the time the data reaches the user. The computing devices 27 also determines a threshold value based on the latency information and dynamically controls a Wi-Fi® power mode of the mobile device 15 based on the threshold value.

Figure 2:
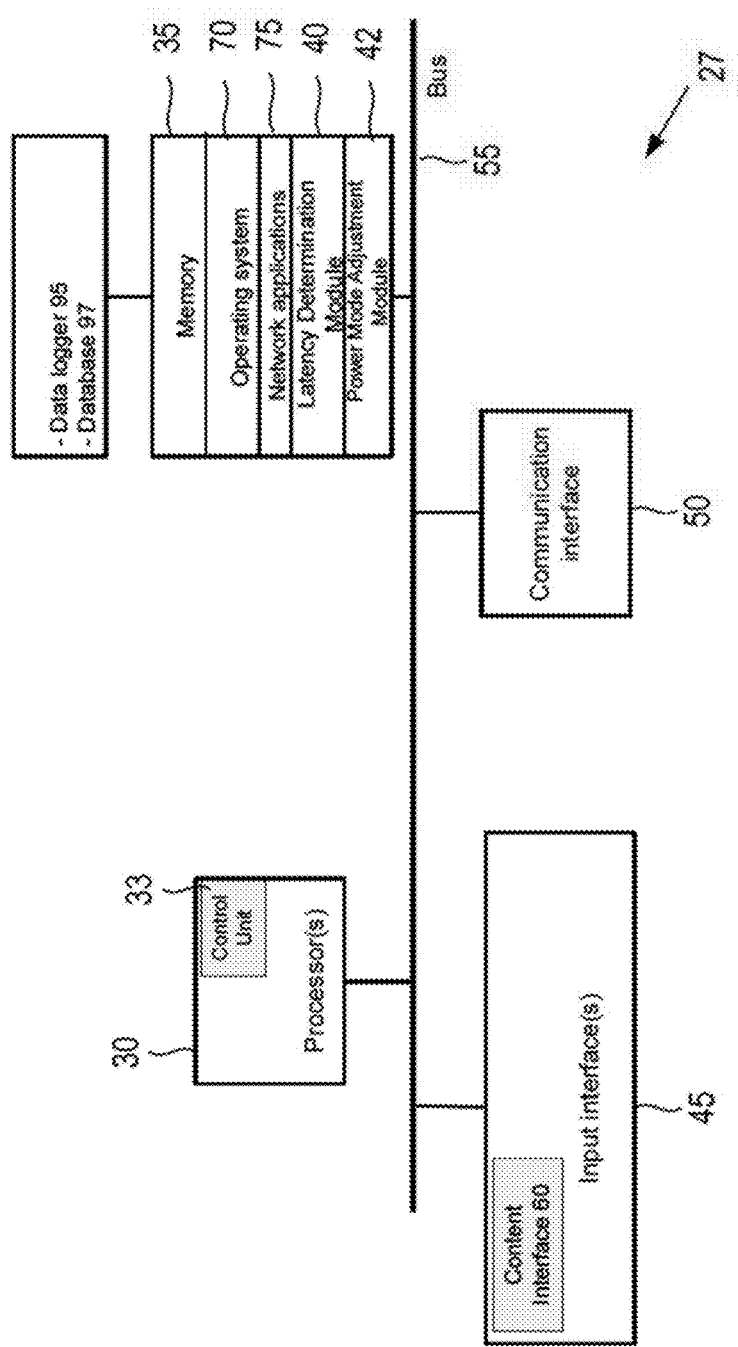
FIG. 2 illustrates a schematic representation showing an example of a computing device of the system of FIG. 1.

FIG. 2 shows a schematic representation of the computing device 27 of the system 10. The computing device 27 can be any suitable device capable of carrying out the techniques described below. The computing device 27 can be a device that is independent from the mobile device 15 or can be included in the mobile device 15. The computing device 27 includes a processor 30 (e.g., a central processing unit, a microprocessor, a microcontroller, or another suitable programmable device), a memory 35, input interfaces 45, and a communication interface 50. Each of these components is operatively coupled to a bus 55. In other examples, the computing device 27 includes additional, fewer, or different components for carrying out similar functionality described herein.

The communication interface 50 enables the computing device 27 and consequently the mobile device 15 to communicate with a plurality of networks and communication links. The external system 20 also includes a communication interface (not shown). The input interfaces 45 can process information from the external system 20, the network 25, and other external systems/systems in communication with the mobile device 15. In one example, the input interfaces 45 include at least a content interface 60. In other examples, the input interfaces 45 can include additional interfaces. The content interface 60 receives content or data (e.g., video, images, data packets, graphics, etc.) associated with at least one mobile application that runs on the mobile device when the device 15 communicates with the external system 20 or any other external device or system. For example, the content interface 60 can receive data packets when the mobile device 15 is making a VoIP call to another device, or a video file when the mobile device is using a video streaming service to download a video from the external system 20 or any other external system or network. In one example, the content received from the mobile external system 20 or other systems or network can be used to determine latency information for each of the applications that run on the mobile device 13 and to create or supplement databases stored in the memory 35.

The processor 30 includes a control unit 33 and may be implemented using any suitable type of processing system where at least one processor executes computer-readable instructions stored in the memory 35. The memory 35 includes any suitable type, number, and configuration of volatile or non-transitory machine-readable storage media 37 (shown in FIG. 3) to store instructions and data.

Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory 35 may also be used for storing temporary variables or other intermediate information during execution of instructions to be executed by processor 30.

The memory 35 may also store an operating system 70, such as Mac OS®, MS Windows®, Unix®, or Linux®; network applications 75; and various modules (e.g., the latency determination module 40; the power mode adjustment module 42, etc.). The operating system 70 can be multi-user, multiprocessing, multitasking, multithreading, and real-time. The operating system 70 can also perform basic tasks such as recognizing input from input devices, such as a keyboard, a keypad, or a mouse; sending output to a projector and a camera; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols including TCP/IP, HTTP, Ethernet®, USB®, and FireWire®.

Software stored on the machine-readable storage media and executed by the processor 30 includes, for example, firmware, applications, program data, filters, rules, program modules, and other executable instructions. The control unit 33 retrieves from the machine-readable storage media and executes, among other things, instructions related to the control processes and methods described herein.

Figure 3:
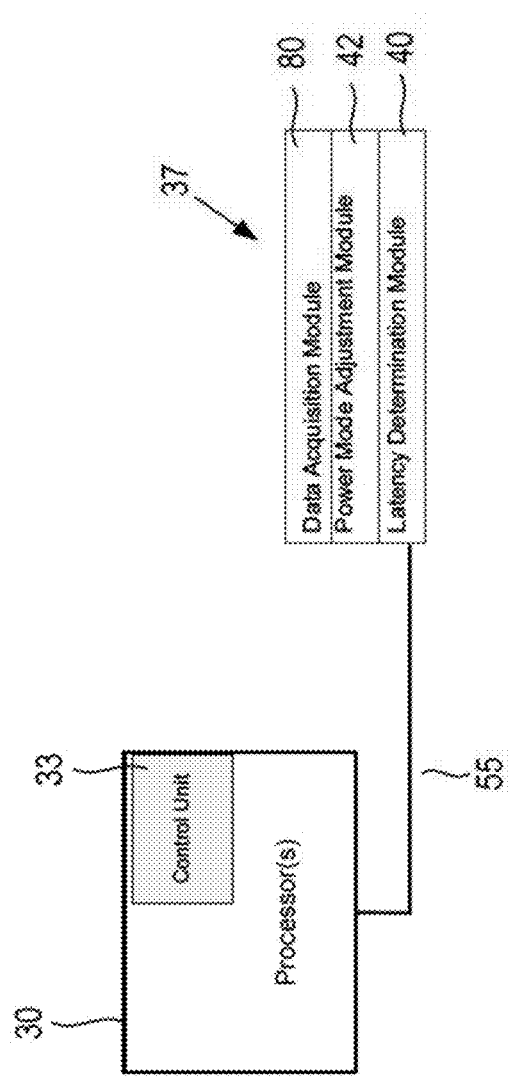
FIG. 3 is a schematic illustration showing an example of a machine-readable storage medium encoded with instructions executable by a processor of the computing device of the system of FIG. 1.

FIG. 3 illustrates an example of a machine-readable storage medium 37 encoded with instructions executable by the processor 30 of the system 10. In one example, the machine-readable storage medium 37 includes a data acquisition module ("DAQ") 80, the latency determination module 40, and the power mode adjustment module 42. In other examples, the machine-readable storage medium 37 can include more or fewer modules (e.g., various other modules related to the operation of the system 10). As explained in additional detail below, the content latency determination module 40 includes various computer-readable instruction components for determining latency information or requirement for each of the plurality of applications running on the mobile device 15. Further, the power mode adjustment module 42 includes various computer-readable instruction components for dynamically adjusting the mobile device 15 between at least two Wi-Fi® power modes based on the priority of the plurality of applications, where the priority is determined by using the latency information for the applications.

Information and data associated with the system 10, the mobile devices 15, and other systems/devices can be stored, logged, processed, and analyzed to implement the control methods and processes described herein. In addition to the data acquisition module 80, the memory 35 includes a data logger or recorder 95 and at least one database 97. Further, the system 10 can also include other databases (not shown) in the mobile device 15 or stored remotely of the mobile device. The DAQ module 80 receives content or data (e.g., video, images, data packets, etc.) associated with mobile applications that run on the mobile device 15 (i.e., data from the external device 20, or from other external systems or networks connected to the mobile device 15).

As noted earlier, each mobile device 15 can run at least one application and it many cases runs a plurality of applications at any given time. These applications affect the energy consumption of the mobile device 15. The Wi-Fi® radio of the mobile device 15 allows switching between different power modes. While PSM saves energy, it also affects the performance of interactive applications in the mobile device 15 by introducing added latency of up to 300 ms. On the other hand, operating the device 15 in CAM consumes large amounts of energy. Thus, it is desired to effectively control the mode of the Wi-Fi® radio of the device 15 between PSM and CAM modes (or any other types of available power modes) in order to regulate the overall energy consumption of the mobile device 15.

The proposed system evaluates the content of at least one (or a plurality of applications) received at the mobile device 15 to determine latency information for each of the applications. Each application running on the mobile device 15 has a different value to a user, due to its purpose or to its content. As content related to an application arrives at the mobile device 15, a user may consume some of it very quickly (e.g., data packets during a VoIP call), while other content may be used with delay or stored (e.g., data from music streaming source).

As explained in additional detail below, the latency information of an application is determined with a taint-tracking technique based on an actual consumption time of the content of each application by the user, where the actual consumption time of the application content includes the time from when the content arrives at the mobile device until the time the content or information derived from the content reaches the user (e.g., via a display, speaker, etc.). Therefore, the proposed system and method analyzes the information flow control of the applications running on the mobile device. In other words, the system analyzes the timing in which the content of an application is consumed by the user, as opposed to consumed by the mobile device 15 (i.e., the system analyzes the user's tolerance to delay the content of the application). Using that information, the system can determine dynamically (i.e., in real-time) whether PSM or CAM should be used and switch the power mode of the mobile device 15 accordingly. Thus, the mobile device can save energy and provide a satisfactory user experience at the same time.

Thus, the information gathered by the DAQ module 80 is provided to the latency determination module 40 and then to the data logger or recorder 95. As explained in additional detail below, the latency determination module 40 uses the content received by the DAQ module 80 using specific techniques (e.g., a taint-tracking technique) to dynamically determining latency information or requirement for each of the plurality of applications running on the mobile device 15. The latency information generated by the latency determination module 40 is then provided to the data logger or recorder 95 that stores the latency information for each application running on the mobile device 15 in the database 97 for further processing and evaluation.

The power mode adjustment module 42 uses the latency information stored in the database 97 to dynamically determine priority of the plurality of applications based on the latency information and to dynamically control a Wi-Fi® power mode of the mobile device 15 based on the latency information of the application. In one example, the database 97 is included in the memory 35 of the computing device 27. In another example, the database 97 is a remote database (i.e., not located in the computing device 27). In that example, the data logger or recorder 95 provides the information through a network (e.g., the network 25) to the database 97.

Therefore, the information and data stored in the database 97 and other databases the system 10 can be accessed by the computing device 27 for processing. For example, by using the methods described below, the computing device 27 may execute power management of the mobile device 15 based on based on the actual consumption time of the content of each application by the user (i.e., the latency information). The control unit 33 retrieves from the machine-readable storage media and executes, among other things, instructions related to the control processes and methods described herein. When executed, the instructions cause the control unit 33 to evaluate data of a plurality of applications received at the mobile device. Further, the instructions cause the control unit 33 to calculate a user consumption time of the data of each application to determine a latency requirement for each of the plurality of applications. The instructions also cause the control unit 33 to determine a priority of the plurality of applications based on the latency requirement for each application, and to dynamically control the Wi-Fi® power mode of the mobile device 15 in real-time based on the priority of the plurality of applications. Real-time is defined as the time in which the plurality of applications are running on the mobile device.

Figure 4:
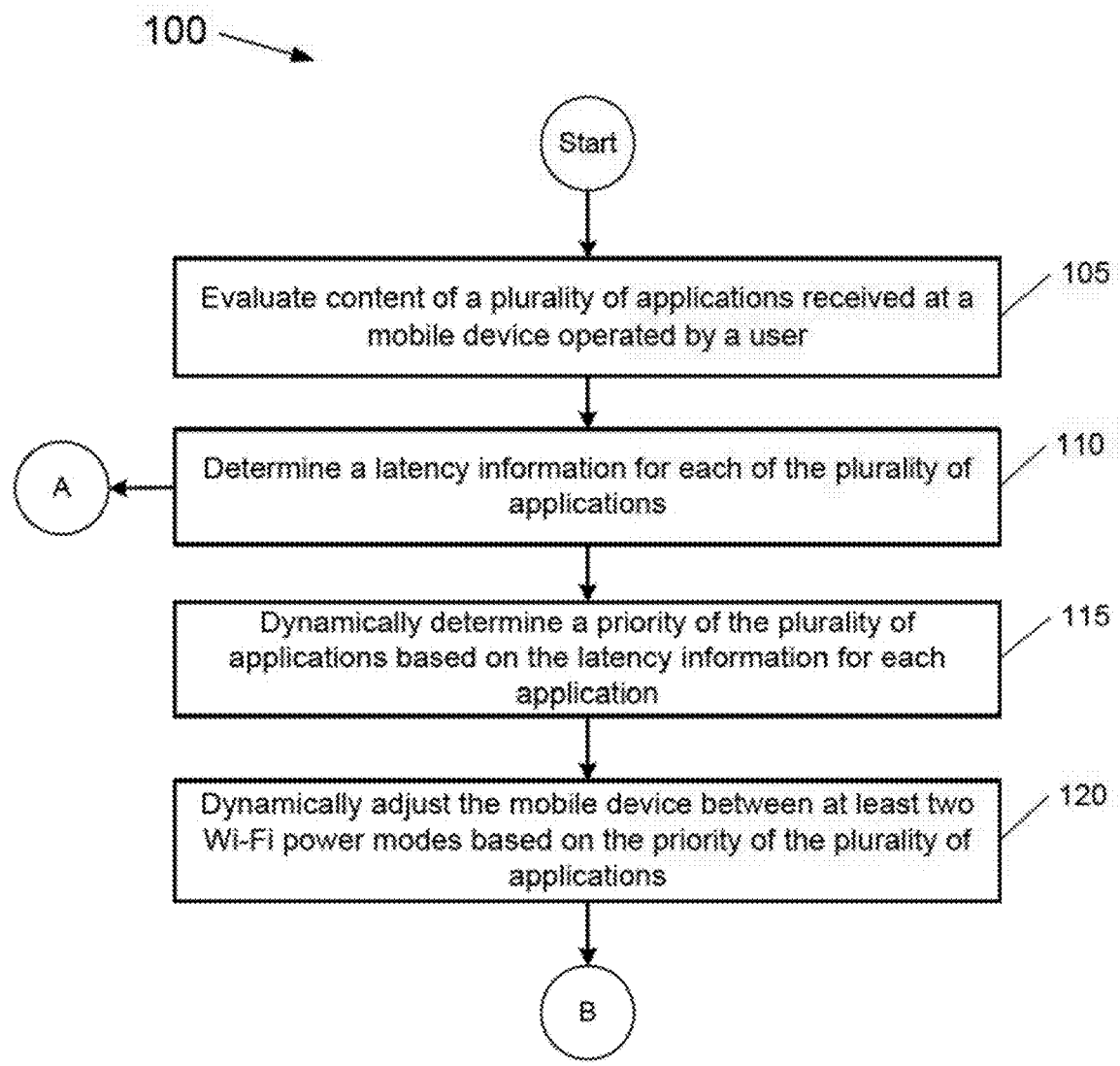
FIG. 4 illustrate a flow chart showing an example of a method for power management of a mobile device.

FIG. 4 illustrates a flow chart showing an example of a method 100 for power management of the mobile device 15 in the system 10. In one example, the method 100 can be executed by the control unit 33 of the processor of the computing device 27. Various steps described herein with respect to the method 100 are capable of being executed simultaneously, in parallel, or in an order that differs from the illustrated serial manner of execution. The method 100 is also capable of being executed using additional or fewer steps than are shown in the illustrated examples.

The method 100 may be executed in the form of instructions encoded on a non-transitory machine-readable storage medium 37 executable by a processor 30 of the computing device 27. In one example, the instructions for the method 100 are stored in the latency determination module 40 and the power mode adjustment module 42.

The method 100 begins at step 105, where the control unit 33 evaluates content of a plurality of applications received at the mobile device operated by a user. The mobile device 15 may run at least one application or multiple applications simultaneously. For example, the mobile device 15 may run a music streaming application and a VoIP call at the same time. Both of these applications provide data to the mobile device 15. The VoIP call sends data packets to the device 15, while the music streaming application provides an audio file. However, these two applications provide content that may reach the user at a different time. The data packets from the VoIP call may be outputted through an output interface (e.g., speakers) of the mobile device immediately after they are received at the mobile device 15. On the other hand, the audio file from the music streaming application may not reach the user immediately (i.e., the user may decide to listen to it later).

Next, at step 110, the control unit determines latency information for each of the plurality of applications running on the mobile device 15. As noted earlier, the mobile device may be running only one application or a plurality of applications. In one example, the latency information of an application is determined based on an actual consumption time of the content of each application by the user. The actual consumption time of the application content includes the time from when the content arrives at the mobile device 15 until the time the content or information derived from the content reaches the user. The time the content or information derived from the content reaches a user includes the time of output of the content through an output interface (not shown) of the mobile device 15. An output interface of the mobile device 15 may include a screen, a speaker, a vibration motor, and/or any other appropriate user interface output device. In one example, the actual consumption time of the application content is determined by using a taint-tracking technique to track a flow of the content of each of the plurality of applications in the mobile device until the content of each application reaches a user.

Figure 4A:
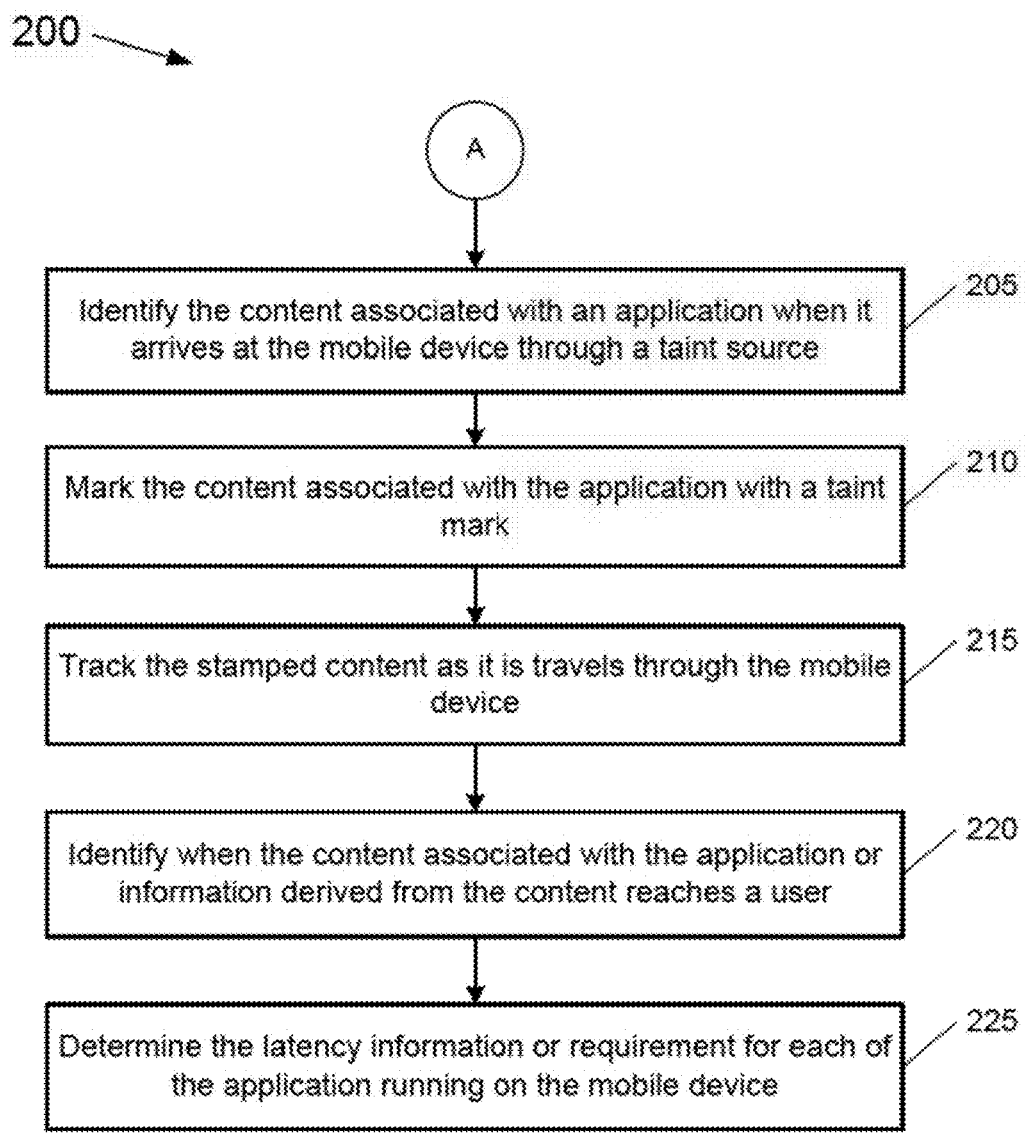
FIG. 4A illustrate a flow chart showing an example of a method for determining latency information for applications running on the mobile device.

FIG. 4A illustrates a flow chart showing an example of a method 200 for determining latency information for the applications running on the mobile device 15. In one example, the method 200 can be executed by the control unit 33 of the processor of the computing device 27. The taint-tracking technique described below tracks the flow of information associated with the applications on the mobile device 15. Taint-tracking provides better insight into the user's behavior, allowing for more detailed and accurate classification of the applications traffic on the user's mobile device 15. As explained in additional detail below, this taint-tracking classification allows the mobile device 15 to adapt its sleep cycles to the latency requirements of the incoming applications. Following the examples described above, the device 15 may use longer sleep cycles when streaming music than when making a VoIP call.

The method 200 begins at step 205, where the content associated with the application is identified when it arrives at the mobile device 15 through a taint source (i.e., the network 25). In some implementations, the proposed method does not require any change in the applications (e.g., Skype®, web browsing applications, etc.) running on the mobile device 15 to use the described taint-tracking technique. In other implementations, some modifications to the applications running on the mobile device 15 may be needed in order to take advantage of taint tracking. The described taint-tracking technique may require some enhancements to the operating system or platform (e.g., Android®, etc.) of the mobile device 15 to keep track of the memory space of the applications running on the operating system. When the content or data associated with the application is encrypted, the operating system of the mobile device 15 may have a key to decrypt the encrypted data. In other implementations, the application running on the device 15 works together with the operating system to decrypt the data and to ensure that the tagged content associated with the application propagates through the device 15. Next, at step 210, the content associated with the application is marked with a taint mark (i.e., a tag) to indicate the information type. Each type of content or data may be marked with a unique taint mark or tag. In one example, the taint mark may be used as a time stamp to identify the exact time when the content begins to arrive at the mobile device 15.

At step 215, the control unit 33 tracks the stamped content as it is travels through the device 15 and it reaches a taint sink (i.e., an output interface of the device 15). During the propagation of the stamped content through the mobile device 15, the system may pass the taint mark (i.e., the tag) of the stamped content to a new content that is derived from the original stamped or tagged content. In other words, the taint-tracking technique tracks how the received data impacts other data (i.e., how stamped incoming data impacts the resulting decoded data). This impacted data is identified before it reaches the user at a taint sink. Thus, the taint-tracking technique keeps track of the modification of the content throughout the data flow in the mobile device 15.

At step 220, the control unit 33 identities when the content associated with the application or information derived from the content reaches a user at a taint sink (i.e., when the song is played on the speakers of the device, etc.). In one implementation, in order to identify when the stamped or tagged content associated with the application reaches a taint sink, the taint-tracking technique may monitor the drivers (e.g., display driver, network driver, speaker driver, etc.) of the output interfaces of the mobile device 15. The taint-tracking technique may record the stamped or tagged content when it reaches a taint sink in the mobile device 15. In addition to monitoring the travel time of the content associated with the applications on the device 15, the taint-tracking technique may also monitor other aspects of the content (e.g., who and when accesses or modifies the content on the device 15, etc.). The control unit 33 monitors not only the actual content but also any data that may be derived from the content associated with the application. The control unit 33 can perform precise calculations of the travel time of the content by using the taint-tracking technique. Alternatively, the control unit 33 may also determine when the content associated with the application reaches any tethered devices (i.e., when is not consumed by the user of the mobile device 15 but by an outside device or user) by tracking or using the network 25 as an output interface.

Based on the taint-tracking of the content associated with the application (i.e. on the actual consumption time of the content of each application by the user), the control unit determines the latency information or requirement for each of the applications running on the mobile device 15 (at step 225). In one example, the latency information for each application may be used to determine whether an application has a high latency or low latency. By marking (i.e., tagging) incoming content as soon as it is received by the mobile device 15 and measuring the time it takes for it to be consumed by the user, it is possible to assign a different sensitivity to each piece of content and consequently to each application. The actual or user consumption time (i.e., the time until the content is retrieved by user or sent to another device) is an important indicator that differentiates between content that is consumed immediately (i.e., has low latency) and content that is buffered but not shown to the user until she decides to consume it (i.e. has high latency). In other words, if a large enough time passes between arrival of the content and consumption of the content, the content may be less sensitive to latency than other content the user receives.

An example of the taint-tracking technique is described below. When the mobile device 15 is running a web browsing application (i.e., the user is viewing a particular web page), the device 15 downloads some content (e.g., text and pictures) from the web site that is being currently displayed on the device. The method 200 identifies the content when it arrives at the mobile device 15 and stamps or tags the different types of content with unique taint mark. Next, the control unit 33 tracks the stamped content as it is travels through the device 15 and it reaches a taint sink (i.e., the screen of the device in this example). If the user does not scroll down the web page, some of the content from the web page is not shown and delivered to the screen. Because this content is not consumed immediately by the user, the latency information for that application increases. Thus, the system may adjust the mobile device to a PCM to save energy.

Thus, the latency determination module 40 dynamically determines specific latency information or requirement for at least one or each of a plurality of applications running on the mobile device 15. The latency information generated by the latency determination module 40 is provided to the data logger or recorder 95 that stores the latency information for each application running on the mobile device 15 in the database 97 for further processing and evaluation.

With continued reference to FIG. 4, the control unit 33 dynamically determines a priority of the plurality of applications based on the latency information for each application (at step 115). In particular, the control unit 33 dynamically analyzes the latency information for each application from the database 97, where the database 97 is updated in real-time. Since the goal of the proposed system and method is to provide power management of the mobile device 15 by adjusting the Wi-Fi® power modes of the device 15, the control unit 33 prioritizes the applications in the mobile device 15 based on their latency. The applications that have the lowest latency (i.e., that are consumed by the user with the least delay) are moved to the top of the database 97 and are used to control the power modes of the mobile device. The control unit 33 dynamically adjusts the mobile device between at least two Wi-Fi® power modes based on the priority of the plurality of applications (at step 120).

Figure 4B:
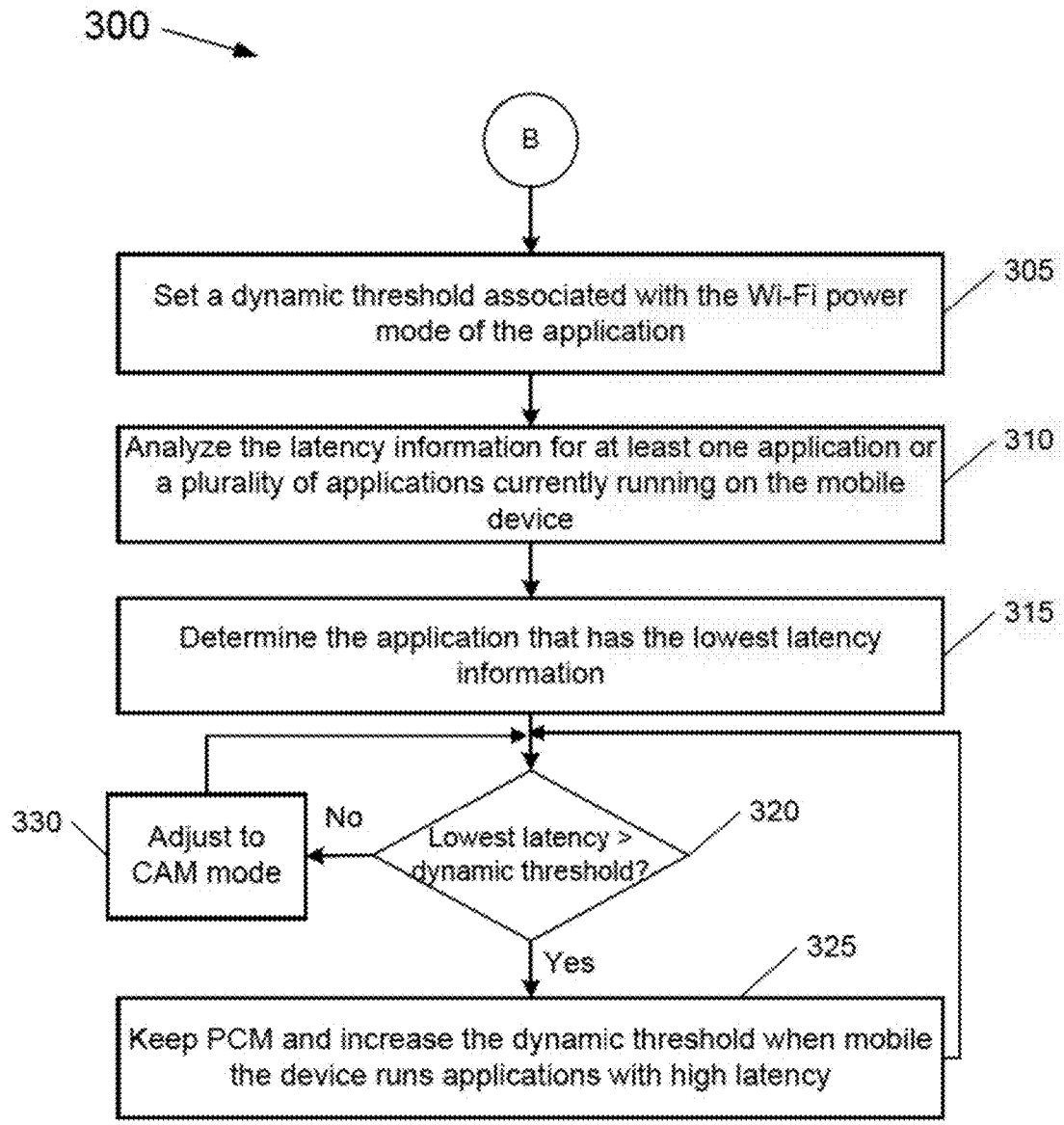
FIG. 4B illustrate a flow chart showing an example of a method for dynamically adjusting the mobile device between at least two Wi-Fi® power modes.

FIG. 4B illustrates a flow chart showing an example of a method 300 for dynamically adjusting the mobile device 15 between at least two Wi-Fi® power modes based on the priority of the plurality of applications. In one example, the method 300 can be executed by the control unit 33 of the processor of the computing device 27.

In one example, adjusting the mobile device between the at least two Wi-Fi® power modes includes monitoring a dynamic threshold determined based on the latency information of the plurality of applications (or one application when a device 15 runs a single application). The method 300 begins at step 305, where the control unit 33 sets the dynamic threshold that is used to control the Wi-Fi® power mode of the application based on the latency of the at least one application. The dynamic threshold needs to control the Wi-Fi® power mode in a way that the mobile device 15 can run applications without disrupting the user's experience (slowing down applications, etc.). In some implementations, the dynamic threshold may have a predetermined value (e.g., 100 ms) that allows the mobile application to run in PCM (i.e., to save energy) and the users experience is not interrupted because the applications that are running on the mobile device 15 have low latency (i.e., will not be immediately consumed by the user).

Next, at step 310, the control unit analyzes the latency information for at least one application (or a plurality of applications) currently running on the mobile device 15. If the mobile device 15 runs only one application, the control unit 33 analyzes the latency information for that application and dynamically control the threshold (and consequently the Wi-Fi® power mode) if necessary as described below.

If the mobile device 15 runs a plurality of applications, the control unit 33 determines the application that has the lowest latency information or requirement from the dynamic database 97 (at step 315). At step 320, the control unit 33 determines whether the lowest latency related to application from the database 97 is greater than the predetermined threshold (when only one application runs on the device 15, the latency of that application is checked against the threshold). When the lowest latency related to an application is greater than the predetermined threshold, the control unit 33 keeps the PSM of the Wi-Fi® radio because the mobile device 15 is able to keep the required latency by using the PSM (at step 325). PSM allows the Wi-Fi® radio to enter sleep mode and to wake up periodically (e.g., every 100 ms) so that the mobile device 15 can receive packets related to the applications running on the device 15. The control unit 33 continuously compares the application with the lowest latency against the dynamic threshold and may increase the dynamic threshold (e.g., in increments of 100 ms) when the device runs applications with high latency (i.e., that will not reach the user soon). That way, the threshold may increase to 300 or 400 ms and this will increase the sleep time of the Wi-Fi® radio, which increases the energy efficiency of the mobile device 15.

On the other hand, when the lowest latency in the application is smaller than the predetermined threshold, the control unit 33 adjusts the Wi-Fi® radio from PCM to CAM (at step 330). The fact that the lowest latency in the mobile device 15 is smaller than the predetermined threshold shows that the application having the lowest latency cannot be executed in PSM without disrupting the user's experience. Therefore, switching to CAM is desired in this case. The control unit 33 determines the threshold value dynamically (i.e., in real-time). Thus, the control unit 33 continuously checks the lowest latency against the dynamic threshold and may switch the Wi-Fi® radio back to PCM when it determines that the application with the lowest latency is greater than the threshold (i.e., based on a new group of applications running on the device 15). By dynamically controlling the Wi-Fi® power of the mobile device 15 and switching to different energy-savings modes in real-time, the proposed system can save energy without disrupting the experience of the end user.

What is claimed is:

1. A method, comprising:
evaluating, with a controller, content of a plurality of applications received at a mobile device operated by a user;
determining, with the controller, latency information for each of the plurality of applications;
dynamically determining, with the controller, a priority of the plurality of applications based on the latency information for each application, wherein the latency information of an application is determined based on an actual consumption time of the content of the application by the user, wherein the actual consumption time includes a time from when the content arrives on the mobile device until a time of output of the content through an output interface of the mobile device; and
dynamically adjusting, with the controller, the mobile device between at least two wireless radio operating power modes based on the priority of the plurality of applications.

2. The method of claim 1, wherein the actual consumption time of the application content is determined by using a taint-tracking technique to track a flow of the content of each of the plurality of applications in the mobile device until the content of each application reaches a user.

3. The method of claim 1, wherein adjusting the mobile device between the at least two wireless radio operating power modes further includes monitoring a dynamic threshold determined based on the latency information of the plurality of applications.

4. The method of claim 3, wherein the dynamic threshold is determined based on the application with a lowest latency.

5. The method of claim 1, wherein the latency information for each application from the plurality of applications is determined based on a tolerance of the user to delay consumption of content of the application.

6. The method of claim 5, wherein the tolerance of the user to delay consumption of the content of the application varies over time, based on a behavior of the user.

7. A system comprising:
a mobile device in communication with at least one external system; and
a computing device connected to the mobile device, the computing device having a control unit to
receive, at the mobile device, data related to at least one application from the at least one external system,
determine latency information for the at least one application, where the latency information is determined based on a consumption rate of the data of the application by a user of the mobile device, wherein the consumption rate includes a time from when the data arrives on the mobile device until a time of output of the data through an output interface of the mobile device,
determine a threshold value based on the latency information, and
dynamically control a wireless radio operating power mode of the mobile device based on the threshold value.

8. The system of claim 7, wherein the control unit is to determine the consumption rate of the data of the application by using a taint-tracking method that tracks a flow of the data of the applications in the mobile device until the data reaches the user.

9. The system of claim 7, wherein the control unit is to determine the threshold value dynamically, in real-time.

10. A non-transitory machine-readable storage medium encoded with instructions executable by a processor of a mobile device, the machine-readable storage medium comprising instructions to:

evaluate data of a plurality of applications received at a mobile device;
calculate a user consumption time of the data of each application to determine a latency requirement for each of the plurality of applications;
determine a priority of the plurality of applications based on the latency requirement for each application, wherein the latency requirement of an application is determined based on an actual consumption time of the content of the application by the user, wherein the actual consumption time includes a time from when the content arrives on the mobile device until a time of output of the content through an output interface of the mobile device; and
dynamically control a wireless radio operating power mode of the mobile device in real-time based on the priority of the plurality of applications.

11. The non-transitory machine-readable storage medium of claim 10, wherein the instructions to calculate the user consumption time of the data of each application further comprise instructions to track a flow of the data of each of the plurality of applications in the mobile device until the data of each application reaches the user by using a taint-tracking technique.

12. The non-transitory machine-readable storage medium of claim 10, wherein the instructions to dynamically control the wireless radio operating power mode of the mobile device further comprise instructions to evaluate a dynamic threshold determined based on the latency requirement of the plurality of applications, where the dynamic threshold is determined based on the application with lowest latency.

* * * * *

UNITED STATES PATENT AND TRADEMARK OFFICE
CERTIFICATE OF CORRECTION

PATENT NO. : 10,278,129 B2
APPLICATION NO. : 14/906655
DATED : April 30, 2019
INVENTOR(S) : Eduardo Alberto Cuervo Laffaye et al.

Page 1 of 1

It is certified that error appears in the above-identified patent and that said Letters Patent is hereby corrected as shown below:

In the Drawings

In sheet 6 of 6, Fig. 4B, reference numeral 325, Lines 1-2, delete "mobile the device" and insert -- the mobile device --, therefor.

Signed and Sealed this
Ninth Day of July, 2019

Andrei Iancu
*Director of the United States Patent and Trademark Office*